(12) United States Patent
Mansouri et al.

(10) Patent No.: US 10,470,180 B2
(45) Date of Patent: Nov. 5, 2019

(54) WIRELESS MICROPHONE SYSTEM

(71) Applicant: Shure Acquisition Holdings, Inc., Niles, IL (US)

(72) Inventors: Mack Mansouri, Wheeling, IL (US); Myzil Elroy Boyce, Naperville, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 73 days.

(21) Appl. No.: 15/879,077

(22) Filed: Jan. 24, 2018

(65) Prior Publication Data

US 2019/0230653 A1    Jul. 25, 2019

(51) Int. Cl.
| | |
|---|---|
| *H04J 3/00* | (2006.01) |
| *H04W 72/04* | (2009.01) |
| *H04B 7/26* | (2006.01) |
| *H04J 3/06* | (2006.01) |
| *H04L 5/14* | (2006.01) |
| *H04R 1/40* | (2006.01) |
| *H04R 3/00* | (2006.01) |

(52) U.S. Cl.
CPC ...... *H04W 72/0446* (2013.01); *H04B 7/2643* (2013.01); *H04J 3/0652* (2013.01); *H04J 3/0694* (2013.01); *H04L 5/1469* (2013.01); *H04R 1/406* (2013.01); *H04R 3/005* (2013.01); *H04R 2420/07* (2013.01)

(58) Field of Classification Search
CPC . H04W 72/0446; H04J 3/0652; H04J 3/0694; H04R 3/005; H04R 1/406; H04R 2420/07; H04B 7/2643; H04L 5/1469
USPC ................................ 370/276, 279, 280, 281
See application file for complete search history.

(56) References Cited

U.S. PATENT DOCUMENTS

| | | | |
|---|---|---|---|
| 4,691,349 | A | 9/1987 | Reichel et al. |
| 5,666,366 | A | 9/1997 | Malek et al. |
| 5,966,376 | A | 10/1999 | Rakib et al. |
| 7,418,053 | B2 | 8/2008 | Perlman et al. |

(Continued)

FOREIGN PATENT DOCUMENTS

| | | |
|---|---|---|
| EP | 2453671 A1 | 5/2012 |
| EP | 2486662 A1 | 8/2012 |

OTHER PUBLICATIONS

Molisch, Andreas F., "Supplementary material: Digital Enhanced Cordless Telecommunications (DECT)," Wireless Communications, 2005, pp. 1-15, John Wiley & Sons, Ltd.

(Continued)

*Primary Examiner* — Chuong T Ho
(74) *Attorney, Agent, or Firm* — Banner & Witcoff, Ltd.

(57) ABSTRACT

A wireless microphone system efficiently combines a pair of antennas so that radio frequency (RF) signals may be transmitted to and from multiple receivers and multiple wireless microphones. The wireless microphone system supports a general radio access technology and may comply with a Digital Enhanced Cordless Telecommunications (DECT) specification. The resource manager combines a received RF component with a first digital component via a first coaxial link to a connected receiver. The receiver also combines a transmitted RF component with a second digital component via a second coaxial link to the resource manager. The first digital component further includes synchronization and data sub-components, which are separated at the receiver.

23 Claims, 15 Drawing Sheets

(56) References Cited

U.S. PATENT DOCUMENTS

| | | |
|---|---|---|
| 7,499,723 B2 | 3/2009 | Higure |
| 8,072,914 B2 | 12/2011 | Brisebois et al. |
| 8,223,675 B2 | 7/2012 | Fukuda |
| 8,452,240 B2 | 5/2013 | Takahashi |
| 8,670,380 B2 | 3/2014 | Green, III et al. |
| 8,843,075 B2 | 9/2014 | Kenkel et al. |
| 8,989,171 B2 | 3/2015 | Zwart et al. |
| 9,019,885 B2 | 4/2015 | Marco et al. |
| 9,144,046 B2 | 9/2015 | Sousa et al. |
| 9,191,987 B2 | 11/2015 | Nentwig |
| 9,344,983 B2 | 5/2016 | Sousa et al. |
| 9,516,399 B2 | 12/2016 | Ohbuchi et al. |
| 2003/0054784 A1 | 3/2003 | Conklin et al. |
| 2007/0054708 A1 | 3/2007 | Kung |
| 2012/0093342 A1* | 4/2012 | Rupprecht .............. H04R 3/00 381/107 |
| 2012/0106751 A1 | 5/2012 | Li et al. |
| 2012/0120313 A1* | 5/2012 | Green ................. H04B 1/04 348/485 |
| 2013/0016647 A1 | 1/2013 | Marco et al. |
| 2014/0211086 A1* | 7/2014 | Wharton ............... H04N 7/185 348/484 |
| 2016/0135184 A1 | 5/2016 | Zavadsky et al. |

OTHER PUBLICATIONS

"The DECT standard explained," DECT Forum, Feb. 1997, pp. 1-16, DECT Forum Secretariat, Switzerland.

Van Dam, Karin, et al., "Digital Enhanced Cordless Telecommunications (DECT)," Wireless Communication, pp. 1-3, 1993, 1995, retrieved online at: <http://www.wirelesscommunication.nl/reference/chaptr01/telephon/dect.htm>.

"Precision Time Control," Wikipedia, May 1, 2017, pp. 1-5, retrieved oniline at <https://en.wikipedia.org/w/index.php?title=Precision_Time_Protocol&oldid=778243103>.

Milne, Alex, "Correct Antenna Distribution in Three Simple Diagrams," RF Venue, 2018, pp. 1-8, retrieved online at: <https://www.rfvenue.com/blog/2016/08/10/correct-antenna-distribution-in-three-simple-diagrams>.

"Pefect sound from the classroom to the boardroom," DECT Today, May 2015, p. 15, Issue 3, DECT Forum, Hampshire, United Kingdom.

Jun. 14, 2019—(WO) International Search Report and Written Opinion—App PCT/US2019/013831.

* cited by examiner

WIRELESS MICROPHONE SYSTEM

BACKGROUND

Wireless microphone system often support multiple (sometimes many) microphones at the same time such as during entertainment venues. In such situations, closely placed processing equipment for the multiple wireless microphones may operate on a crowded and chaotic wireless spectrum. Undesirable consequences may occur including the generation of inter-modulation distortion products and an aesthetically unappealing configuration of the processing equipment.

SUMMARY

This summary is provided to introduce a selection of concepts in a simplified form that are further described below in the Detailed Description. This Summary is not intended to identify key features or essential features of the disclosure.

A wireless microphone system efficiently combines a pair of antennas so that radio frequency (RF) signals can be transmitted to and from multiple receivers (fixed parts (FP)) and multiple wireless microphones (portable parts (PP)). With an aspect of the disclosure, the wireless microphone system may comply with a Digital Enhanced Cordless Telecommunications (DECT) standard providing a general radio access technology for wireless telecommunications.

With another aspect of the disclosure, a resource manager may support multiple receivers, where each receiver may support different wireless microphones. The resource manager may provide synchronization to co-located receivers (typically more than three), thus enabling efficient use of the available wireless spectrum. Each receiver may support one or more wireless microphones. With some embodiments, a receiver may support as many as two wireless microphones at a given time.

With another aspect of the disclosure, a wireless microphone system may comprise multiple resource managers for a large installation, where the installation may be partitioned into multiple zones.

With another aspect of the disclosure, a wireless microphone system may comprise multiple resource managers, where one of the resource managers is configured as a primary resource manager and the other resource managers (which may be referred as secondary resource managers) are connected to the primary resource manager via RF ports.

With another aspect of disclosure, a resource manager receives a radio frequency (RF) component from a wireless microphone and combines the RF component and a digital component into a combined signal. The digital component may further comprise a data sub-component and a synchronization sub-component. The resource manager may then send the combined signal to a connected receiver over a single coaxial link (cable), thus providing an efficient approach of connecting hardware units within a wireless microphone system. The receiver is able to separate the RF component, data sub-component, and synchronization sub-components to process the RF component for the associated wireless microphone.

With another aspect of the disclosure, a data sub-component may include configuration and/or calibration information conveyed between a resource manager and a connected receiver. The data sub-component may be based on a real-time serial data format as supported by a universal asynchronous receiver-transmitter (UART).

With another aspect of the disclosure, data format may be in accordance with a UART serial format, a user-defined serial format, or a 8b/10b code format.

With another aspect of the disclosure, a receiver combines a transmitted RF component (associated with the corresponding wireless microphone) and a digital component and sends the combined signal to the connected resource manager over a single coaxial link. The transmitted RF component is then transmitted over a wireless communication channel to the corresponding wireless microphone.

With another aspect of the disclosure, a resource manager and a connected receiver are connected via two coaxial links (full duplex operation). A first coaxial link transports a first combined signal from the resource manager to the connected receiver while a second coaxial link transports a second combined signal from the receiver to the resource manager.

With another aspect of the disclosure, a resource manager and a connected receiver/another secondary device are connected via a single coaxial link (half duplex operation). The coaxial link transports a first combined signal from the resource manager to the connected receiver and a second combined signal from the receiver to the resource manager.

With another aspect of the disclosure, a wireless microphone system may support a plurality of wireless microphones over a wireless channel based on time division multiple access (TDMA), where a resource manager allocates different timeslots to different wireless microphones. The wireless microphone system, for example, may comply with Digital Enhanced Cordless Telecommunications (DECT) specifications. Some of the timeslots (receive timeslots) may be allocated for reception from the wireless microphones while the other timeslots (transmit timeslots) may be allocated to transmission to the wireless microphones.

With another aspect of the disclosure, a wireless microphone system allocates a first subset of the receive timeslots to a designated wireless microphone to obtain an audio signal from the wireless microphone while assigning a second subset of the transmit timeslots to send information and/or control signals to the wireless microphone.

With another aspect of the disclosure, a wireless microphone system may allocate a different number of timeslots to different wireless microphones. The number of timeslots may be determined by a setting of one more switches at the wireless microphone system or may be determined by a spectral analysis of the received signal from a wireless microphone. The spectral analysis may indicate the content type (such as music) characterizing the received signal.

With another aspect of the disclosure, the number of timeslots requested for a wireless microphone is determined by the content type sent from the wireless microphone and/or latency considerations.

With another aspect of the disclosure, a wireless microphone system comprises a plurality of synchronization sources. Synchronization sources may be obtained from a Global Positioning System (GPS) signal, Precision Time Protocol (PTP) timing signal, or a user defined signal. The wireless microphone system may select one of the synchronization sources based on one or more criteria. For example, a resource manager may select one of the synchronization sources to reduce an amount of jitter of a synchronization signal. Hardware units of the wireless microphone system (including receivers and wireless microphones) synchronize, adjust, and maintain internal clocks according to the reference synchronization timing.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Aspects of the disclosure relate to a wireless microphone system that efficiently combines a pair of antennas so that radio frequency (RF) signals can be transmitted to and from multiple receivers (fixed parts (FP)) and multiple wireless microphones (portable parts (PP)). With an aspect of the disclosure, the wireless microphone system may be based on a Digital Enhanced Cordless Telecommunications (DECT) standard providing a general radio access technology for wireless telecommunications.

Figure 1:
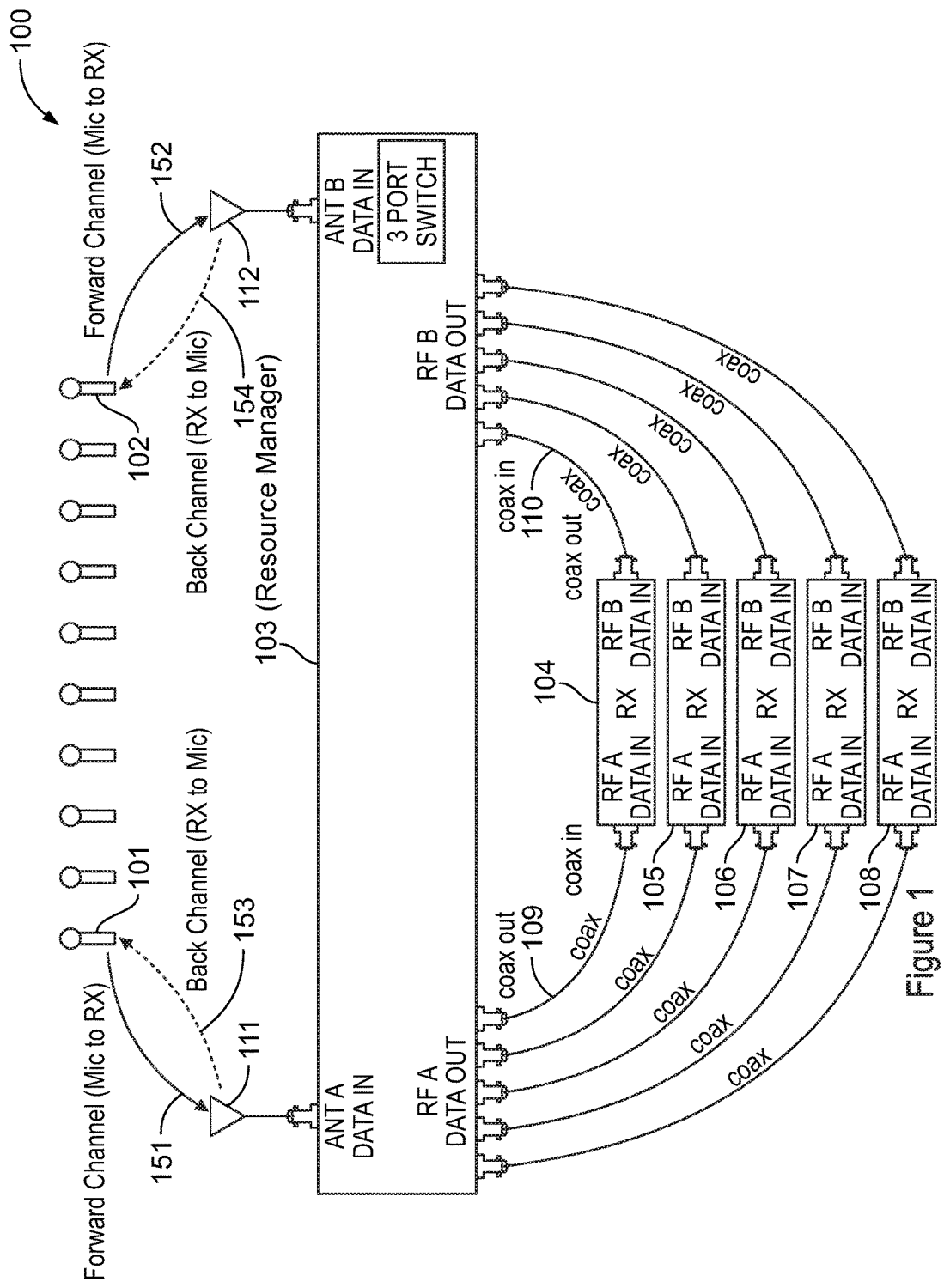
FIG. 1 shows an apparatus for supporting a plurality of wireless microphones in accordance with an aspect of the embodiments.

FIG. 1 shows an apparatus 100 for supporting a plurality of wireless microphones 101, 102 in accordance with an aspect of the embodiments. Apparatus 100 comprises resource manager 103 and a plurality of receivers 104-108. Each receiver may support two wireless microphones. However, some embodiments may support a different number of receivers and a different number of wireless microphones per receiver.

Apparatus 100 may support wireless microphones 101 and 102 using a common wireless spectrum over for forward channels 151,152 and back channels 153,154. Embodiments may support different multiple access schemes including time division multiple access (TDMA), code division multiple access (CDMA), and spread spectrum multiple access (SSMA).

With some embodiments, apparatus 100 supports Digital Enhanced Cordless Telecommunications (DECT), which is based on Time Division Duplex (TDD) and Time Division Multiple Access (TDMA) with ten RF carriers in the 1880-1900 MHz band. DECT has a TDD/TDMA frame structure, where a complete frame has a 10 millisecond-duration with 24 timeslots, during which an RF signal is either transmitted or received at resource manager 103 during a given timeslot. A typical DECT timeslot is 417 microseconds long and contains 420 bits. A first subset of the timeslots may be allocated for the transmission from resource manager 103 to wireless microphones 101 and 102 while the remaining timeslots may be allocated for transmission from wireless microphones 101 and 102 to resource manager 103.

With some embodiments, resource manager 103 toggles the selection of antennas 111 and 112, where antennas 111 and 112 are configured to transmit and receive, respectively, during even DECT frames while antennas 111 and 112 are configured to receive and transmit, respectively, during odd DECT frames.

When resource manager 103 is transmitting on back channel 153,154 (which may be referred as dummy bearer transmission) on one antenna (for example, antenna 111), the other antenna (for example, antenna 112) is used to measure the received signal strength indicator (RSSI) of wireless microphones 101,102. Receivers 104-108 operate in concert with this pattern.

With some embodiments, resource manager 103 operates in the transmit mode (dummy bearer transmission on back channels 153,154) during transmit timeslots 3, 7, 11, 15, 19, and 23 and in the receive mode during the remaining timeslots (receive timeslots 0, 1, 2, 4, 5, 6, 8, 9, 10, 12, 13, 14, 16, 17, 18, 20, 21, and 22). Wireless microphone 101,102 generates an audio signal (for example, indicative of music or speech) over the allocated receive timeslots. Wireless microphone 101,102 is also provided operational information (such as of a transmit power, level, next dummy bearer slot (DB), media access control (MAC) information, and the like) over transmit timeslots.

With some embodiments, wireless microphone 101 may be allocated timeslots in either a static or dynamic manner. For example, wireless microphone 101 may be statically assigned timeslot 5 and 6 on a given DECT carrier for the duration of its connection to resource manager 103. As another example, wireless microphone 101 may be dynamically assigned timeslots, where timeslots 5 and 6 are assigned during one DECT frame and timeslots 12 and 17 are assigned during another DECT frame.

Resource manager 103 routes RF signals between antennas 111,112 and receivers 104-108. A receiver 104-108 processes the RF signals during the timeslots allocated for the corresponding wireless microphones. For example, RF signals to/from wireless microphone 101 may processed by receiver 104 and RF signals to/from wireless microphone 102 may be processed by receiver 105. Continuing the example, receiver 104 processes the received RF signal during the allocated receive timeslots (for example, timeslots 4 and 5) to obtain the audio signal from wireless microphone 101.

With some embodiments, each receiver 104-108 is electrically connected to resource manager 103 through two coaxial links 109 and 110. As will be discussed, a first combined signal is sent from resource manager 103 to receiver 104 through coaxial link 109 and a second combined signal is sent from receiver 104 to resource manager 103 over coaxial link 110. Receiver 104 processes the received RF component included in the first combined signal to obtain the audio signal from the associated wireless microphone (for example, wireless microphone 101). Also, receiver 104 processes the transmitted RF component transmitted to the associated wireless microphone and includes it in the second combined signal.

Figure 2:
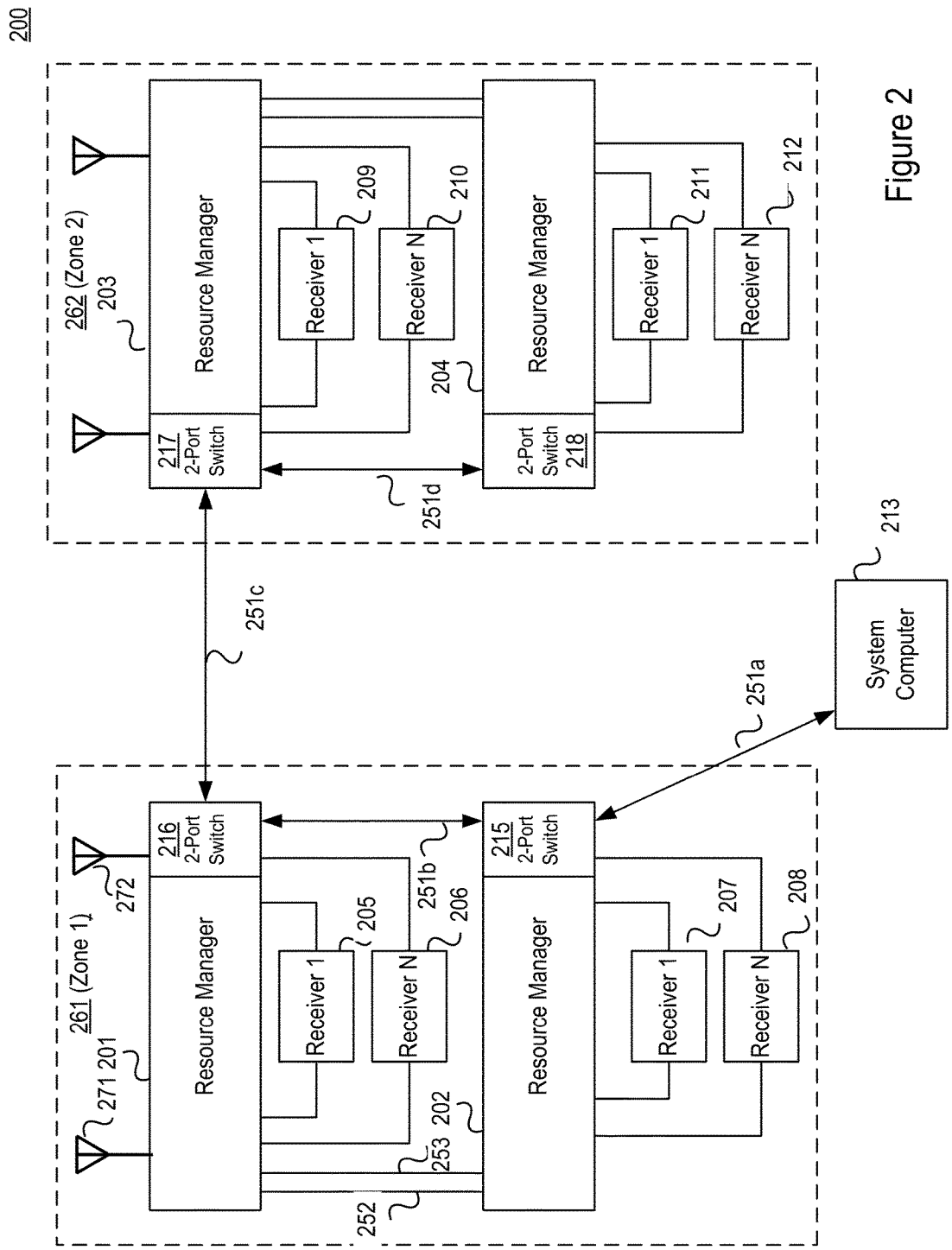
FIG. 2 shows a wireless microphone system that supports a wireless microphones in a plurality of zones in accordance with an aspect of the embodiments.

FIG. 2 shows wireless microphone system 200 that supports wireless microphones (not explicitly shown) in zones 261 and 262 in accordance with an aspect of the embodiments.

Wireless microphone system 200 may be configured to have the capacity to support a desired number of wireless microphones in each zone 261, 262, where resource manager 201 and receivers 205,206 support wireless microphones in zone 261 and resource manager 203 and receivers 209,210 support wireless microphones located within zone 262. The capacity in zone 261 may be increased by adding resource manager 202 and receivers 207,208 while the capacity in zone 262 may be increased by adding resource manager 204 and receivers 211,212.

With some embodiments, resource managers may be added by connecting the resource managers through cascaded coaxial links via output cascade ports and the input cascade ports. For example, two cascaded coaxial links 252 and 253 may be added between resource managers 201 and 202 to provide RF connectivity to antennas 271 and 272, respectively.

With some embodiments, resource managers 201-204 are configured for different RF carriers in the allocated DECT spectrum.

Operation of wireless microphone system 200 may be controlled by system computer 213 through control links 251a-d. For example, system controller 213 may determine that a wireless microphone being served in zone 261 by resource manager 201/receiver 205 should be transferred (handed-off) to another resource (for example, resource manager 203/receiver 209) in zone 262 as the wireless microphone moves toward zone 262 from zone 261. This decision may be based on RSSI information provided by the wireless microphone, as previously discussed, in order to obtain better service for the wireless microphone as indicated by the RSSI. Typically, the received signal strength increases with the RSSI, and consequently, the received signal quality is improved as a result of the handover.

With some embodiments, control links 251a-d may comprise cascaded cables, for example, category 5 (cat 5) cable having twisted pairs of wire, that are connected through two-port switches 215-218, respectively.

Figure 3:
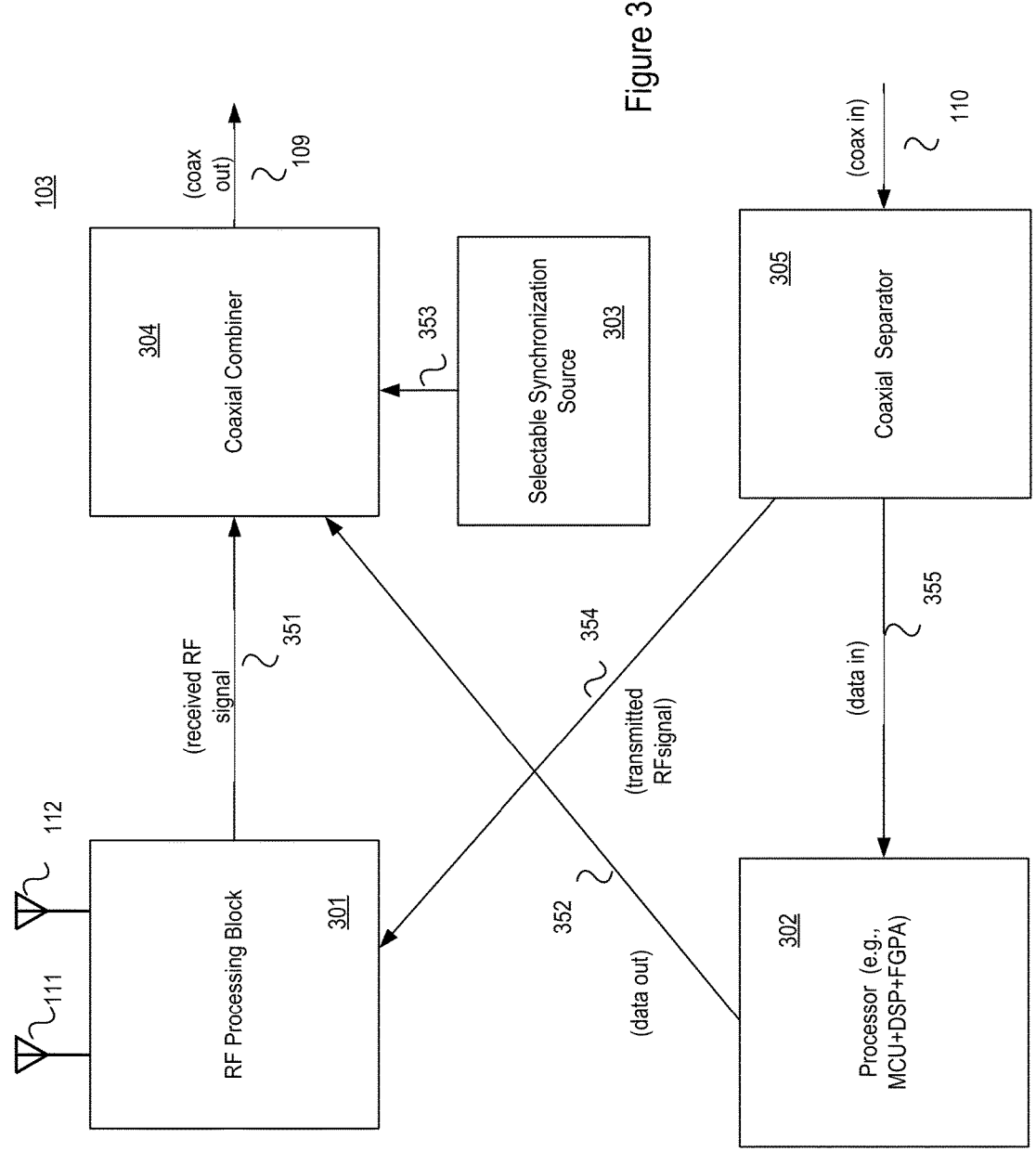
FIG. 3 shows a resource manager in accordance with an aspect of the embodiments.

FIG. 3 shows resource manager 103 in accordance with an aspect of the embodiments. RF processing block 301 obtains the received signals from wireless microphones through antennas 111 and 112 (as shown in FIG. 1) and distributes the received RF signal 351 to coaxial combiner 304.

Processor 302 may include various computing devices including one or more microcomputer units (MCU), digital signal processors (DSP), and/or field programmable gate arrays (FPGA).

Coaxial combiner 304 obtains RF component 351 as well as data sub-component 352 from processor 302 and synchronization sub-component 353 from selectable synchronization source 303 (collectively referred a digital component) and sends a first combined signal to the connected receiver via coaxial link 109.

Coaxial separator 305 separates transmitted RF component 354 and digital component 355 from a second combined signal obtained from receiver 104 via coaxial link 110. Processor 302 then processes data from digital component 355, which is indicative of calibration and configuration information. RF component 354 is routed to processing block 301 so that RF component 354 can be transmitted to corresponding wireless microphone over RF back channel 153,154.

With some embodiments, resource manager 103 may utilize an RF choke arrangement (not explicitly shown) to isolate RF component 351 from the digital component (collectively sub-components 352 and 353) and RF component 354 from digital component 355.

Figure 4:
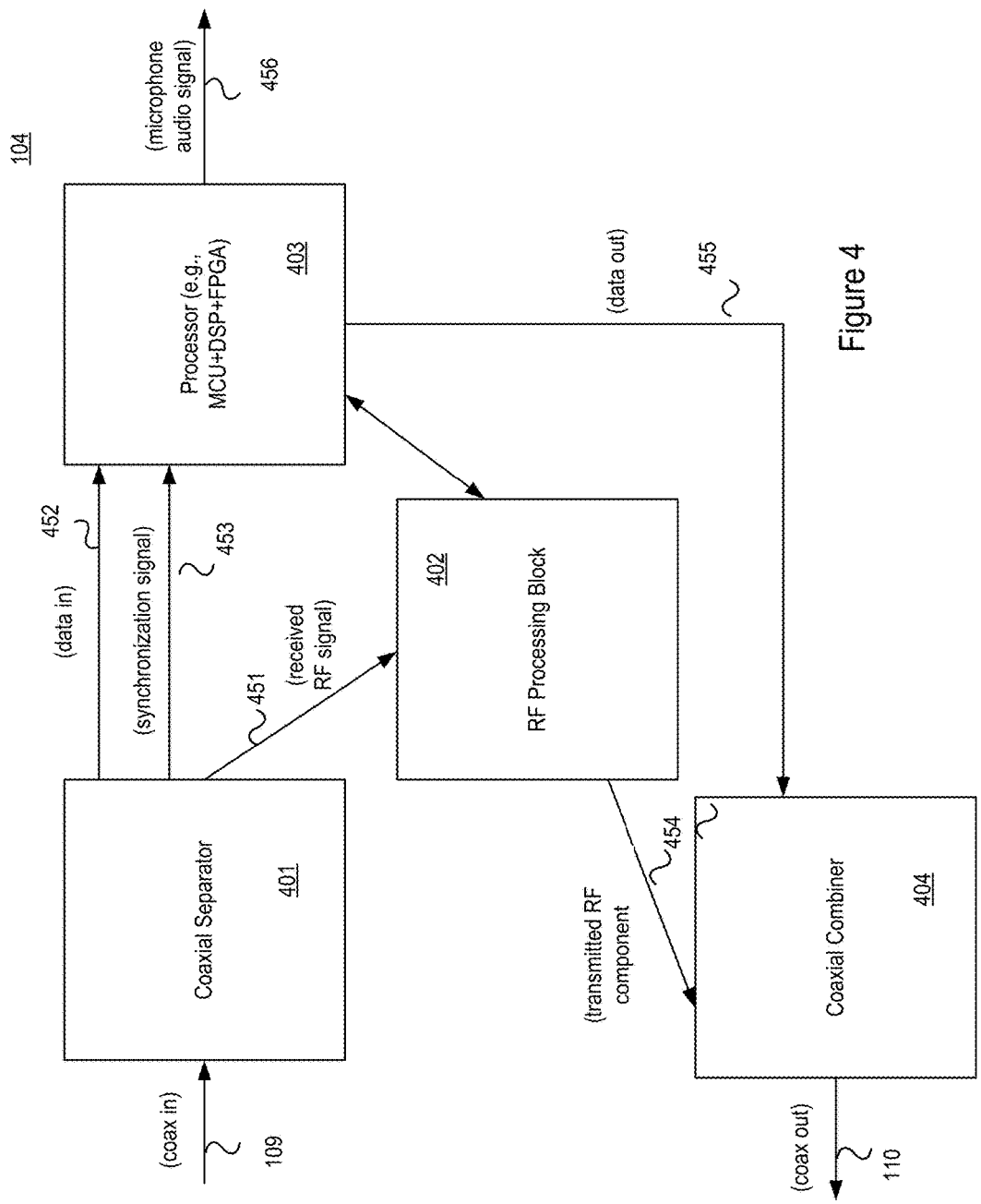
FIG. 4 shows a receiver supporting full duplex operation in order to interact with the resource manager shown in FIG. 3 in accordance with an aspect of the embodiments.

FIG. 4 shows a secondary apparatus (for example, receiver 104) supporting full duplex operation in order to interact with a primary apparatus (for example, resource manager 103) shown in FIG. 3 in accordance with an aspect of the embodiments.

Figure 14:
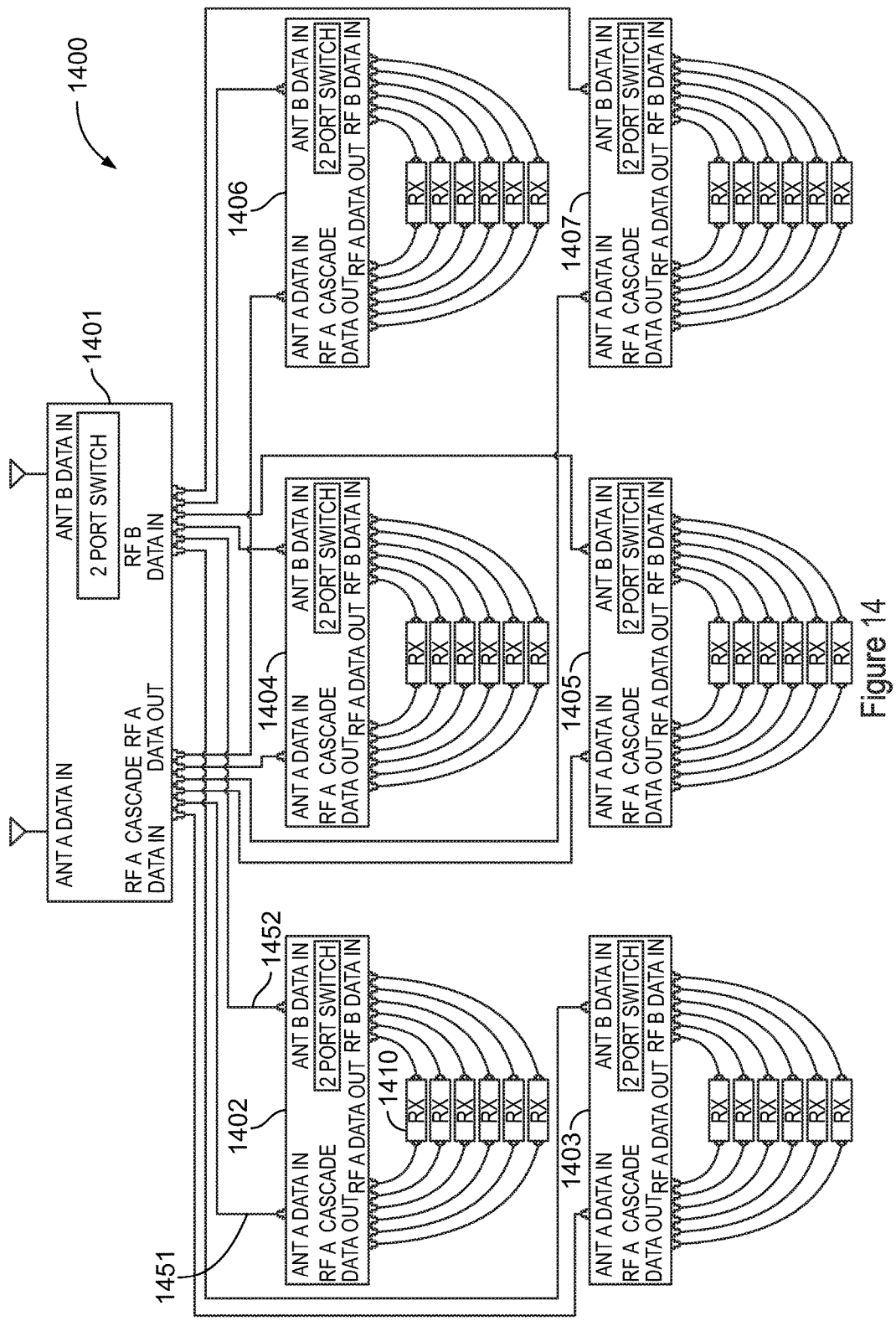
FIG. 14 shows a wireless microphone system configured with a primary resource manager and a plurality of secondary resource managers in accordance with an aspect of the embodiments.

While FIG. 4 explicitly shows receiver 104, some embodiments may support other types of secondary apparatuses, which obtain synchronization from a connected primary apparatus. For example, as shown in FIG. 14 as will be discussed in further detail, secondary resource manager 1402 obtains a synchronization signal by separating the synchronization signal from a composite signal obtained over coaxial connection 1451 and/or coaxial connection 1452 from primary resource manager 1401.

Coaxial separator 401 separates the components (RF received signal 451, data sub-component 452, and synchronization sub-component 453) for the first combined signal received from resource manage 104 via coaxial link 109.

Processor 403 may include various computing devices including one or more microcomputer units (MCU), digital signal processors (DSP), and/or field programmable gate arrays (FPGA). Processor 403 processes RF signal 451 via RF processing block 402 by aligning the timeslots according to synchronization signal 453 and extracting microphone audio signal 456 from the allocated timeslots for the wireless microphone.

While not explicitly shown, microphone audio signal 456 may be further processed, for example, by combining (mixing) signal 456 with other audio signals of other wireless microphones.

Processor 403, via RF processing block 402, generates transmitted RF component 454, which is transmitted to the wireless microphone during the allocated timeslots on back channel 153,154. RF component 454 may convey information to the wireless microphone including real-time timeslot configuration, receiver status, MAC layer messaging, and the like.

Coaxial combiner 404 combines RF component 454 and data component 455 into the second combined signal, which is sent to resource manager 103 via coaxial link 110.

With some embodiments, receiver 104 may utilize an RF choke arrangement (not explicitly shown) to isolate RF component 451 from the digital component (collectively sub-components 452 and 453) and RF component 454 from digital component 455.

Processing devices 302 and 403 and system computer 213 may execute computer executable instructions from a computer-readable medium in order to process RF signals to and from wireless microphones. With some embodiments, an apparatus 100 may comprise processing devices 302 and 403 and system computer 213. Apparatus 100 may include one or more application-specific integrated circuits (ASICs), complex programmable logic devices (CPLDs), field-programmable gate arrays (FPGAs), or other integrated circuits. Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a processor. The executable instructions may carry out any or all of the method steps described herein.

Figure 5:
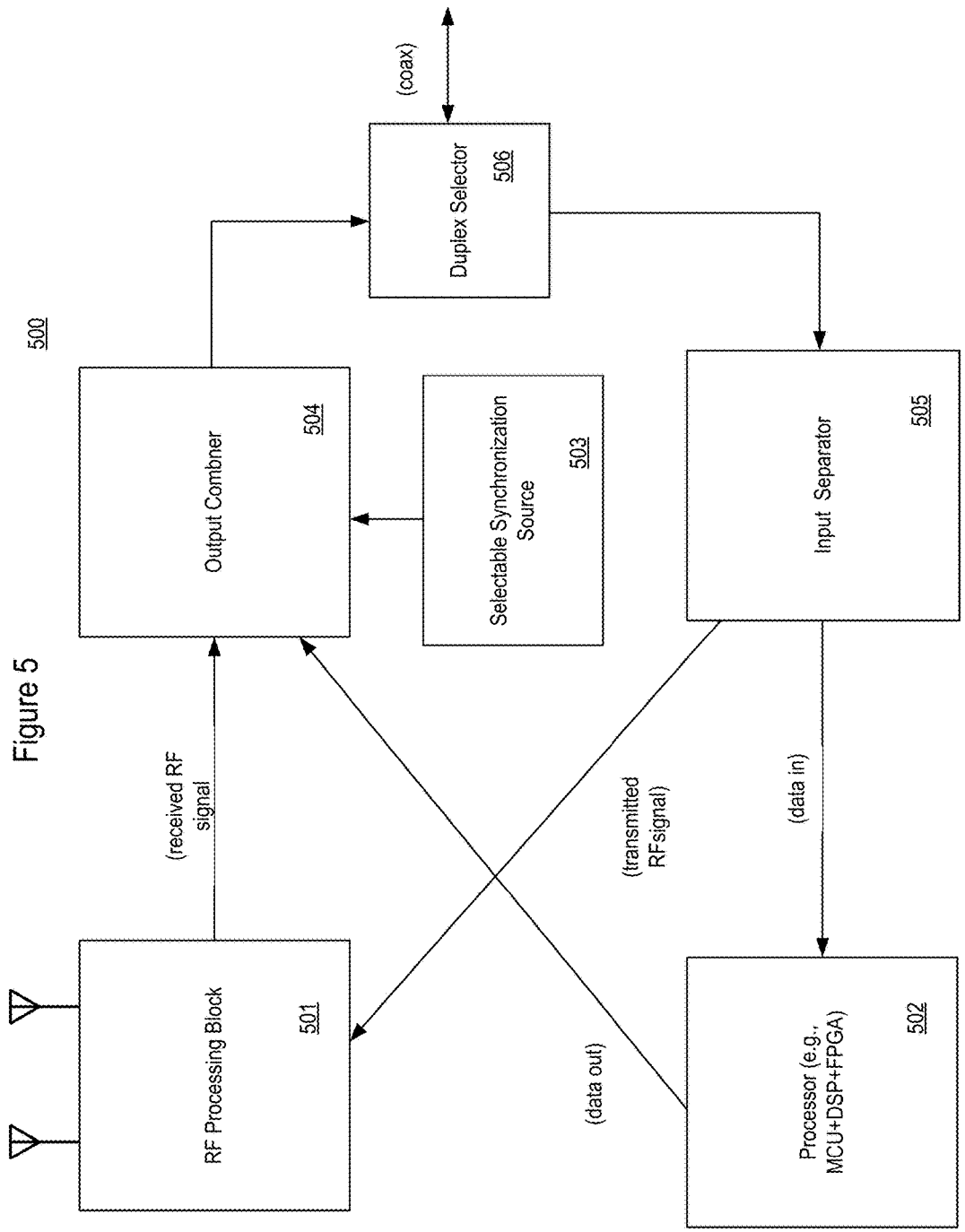
FIG. 5 shows a resource manager in accordance with an aspect of the embodiments.
Figure 6:
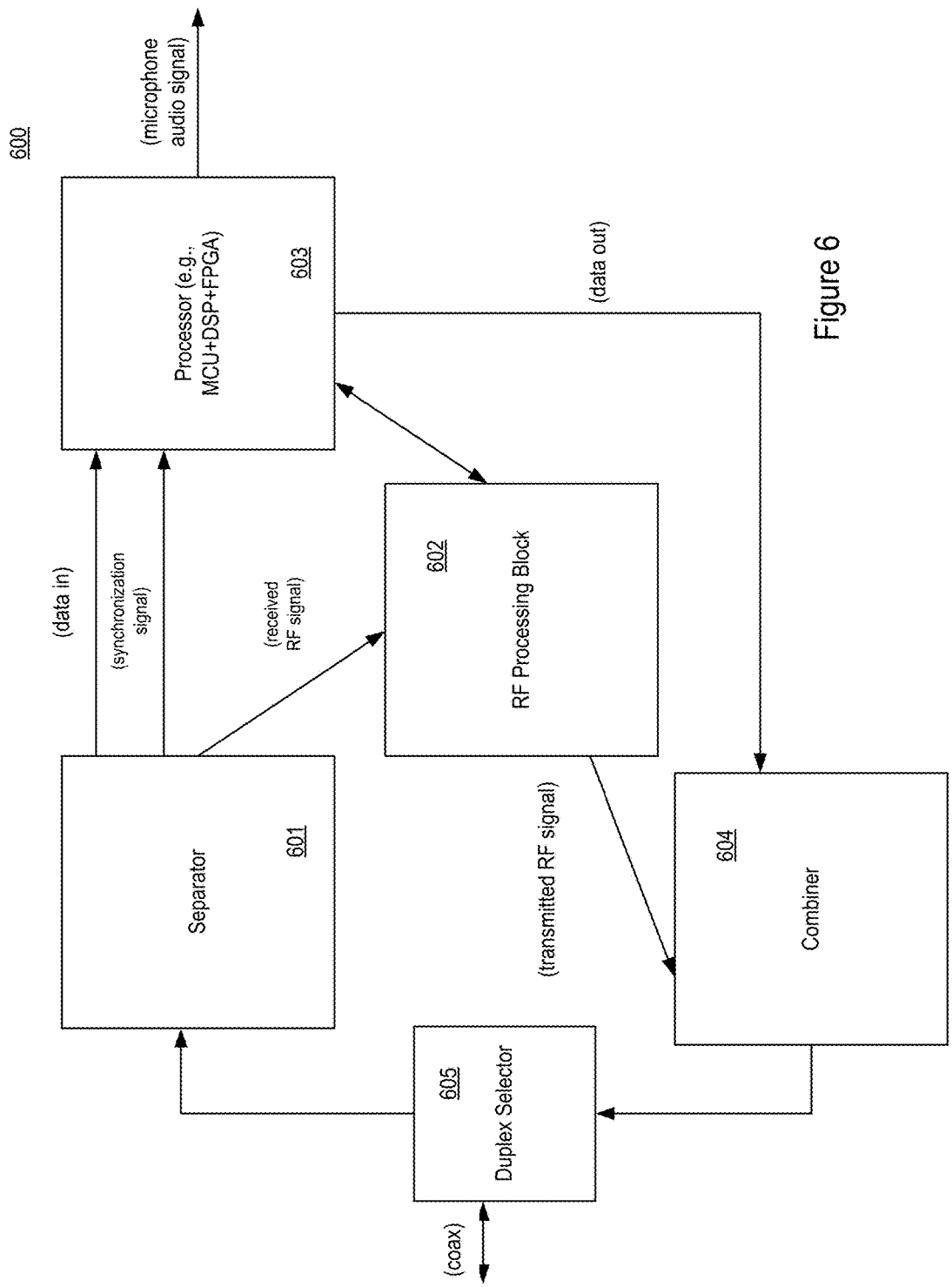
FIG. 6 shows a receiver supporting half duplex operation in order to interact with the resource manager shown in FIG. 5 in accordance with an aspect of the embodiments.

FIGS. 5 and 6 shows primary apparatus 500 (for example, a resource manager) and secondary apparatus 600 (for example, a remote antenna accessory) in accordance with an aspect of the embodiments. While resource manager 103 as shown in FIGS. 1 and 3 supports full duplex operation, where first and second combined signals are transported over separate coaxial links 109 and 110, respectively, resource manager 500 and receiver 600 support half duplex operation, where first and second combined signals are transported over the same coaxial link.

Resources manager 500 and receiver 600 employ duplex selectors 506 and 605, respectively, to activate the coaxial link in either the forward or reverse directions. When the coaxial link is activated in the forward direction, the first combined signal is transported from resource manager 500 to receiver 600. When the coaxial link is activated in the reverse direction, the second combined signal is transported from receiver 600 to resource manager 500.

With some embodiments, half duplex operation may change direction within a frame (intra-frame operation) or from frame to frame (inter-frame operation). For example, with intra-frame operation the coaxial link may be activated in the forward or reverse directions during the first half or second half of a frame, respectively. As another example, with inter-frame operation the coaxial link may be activated in the forward or reverse directions during a particular frame or next occurring frame, respectively.

Figure 7A:
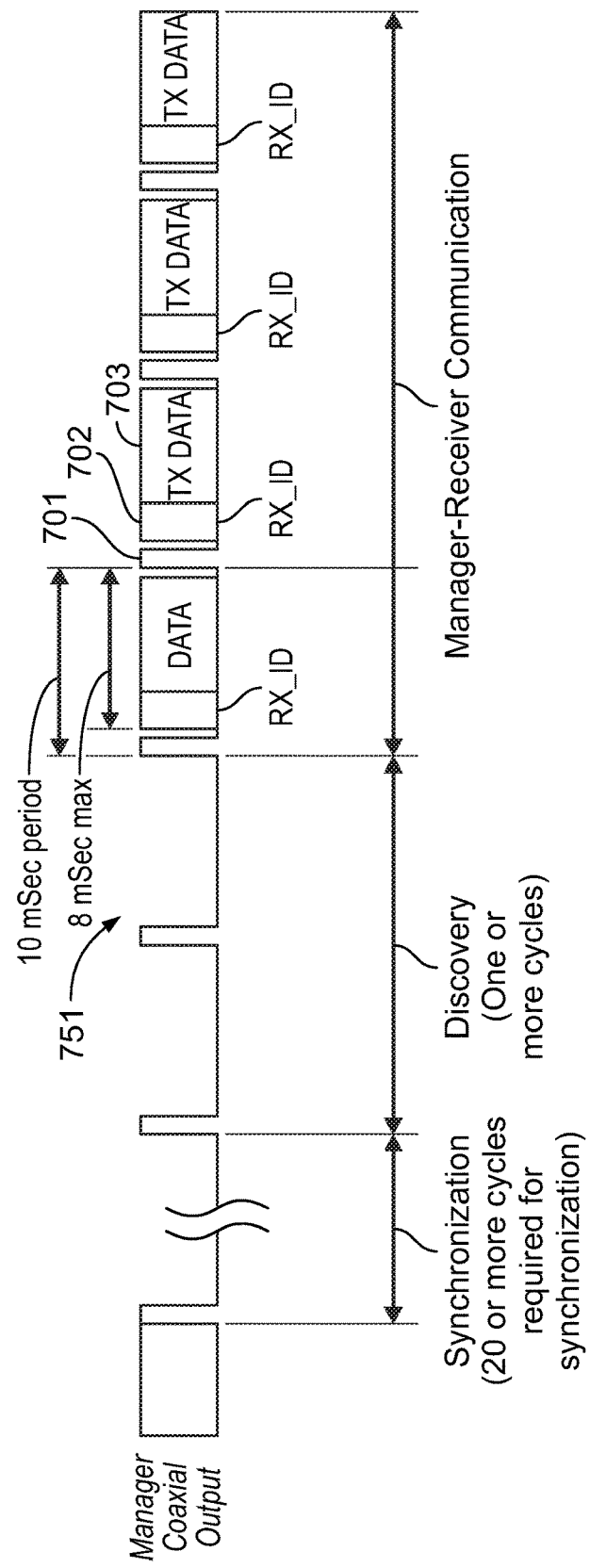
FIG. 7A shows a combined signal sent from a resource manager and a receiver over a coaxial link in accordance with an aspect of the embodiments.

FIG. 7A shows combined signal 751 conveyed from resource manager 103 and receiver 104 over a coaxial link in accordance with an aspect of the embodiments. While not explicitly shown in FIG. 7A, there is also an RF component superimposed on the digital component that comprises synchronization sub-component 701 and a data sub-component that further includes RX_ID 702 and TX_DATA 703. With some embodiments, resource manager 103 (as shown in FIG. 3) and receiver 104 (as shown in FIG. 4) may utilize an RF choke arrangement (not explicitly shown) to isolate the RF component from the digital component.

RX_ID 702 identifies receiver 104 from the plurality of receivers 104-108 and TX_DATA 703 includes information for calibration and configuration between resource manager 103 and receiver 104.

The RF component includes the RF signal received from the wireless microphones transmitting on the associated DECT carrier, where receiver 104 extracts the audio signal from wireless microphones assigned to receiver 104 by processing the timeslots allocated to the assigned microphones. Receiver 104 uses synchronization sub-component 701 to properly align the timeslots.

Synchronization sub-component 701 may be derived from a reference synchronization signal and multiplexed with serial data (RX_ID 702+TX_DATA 703) obtained from a UART.

Figure 7B:
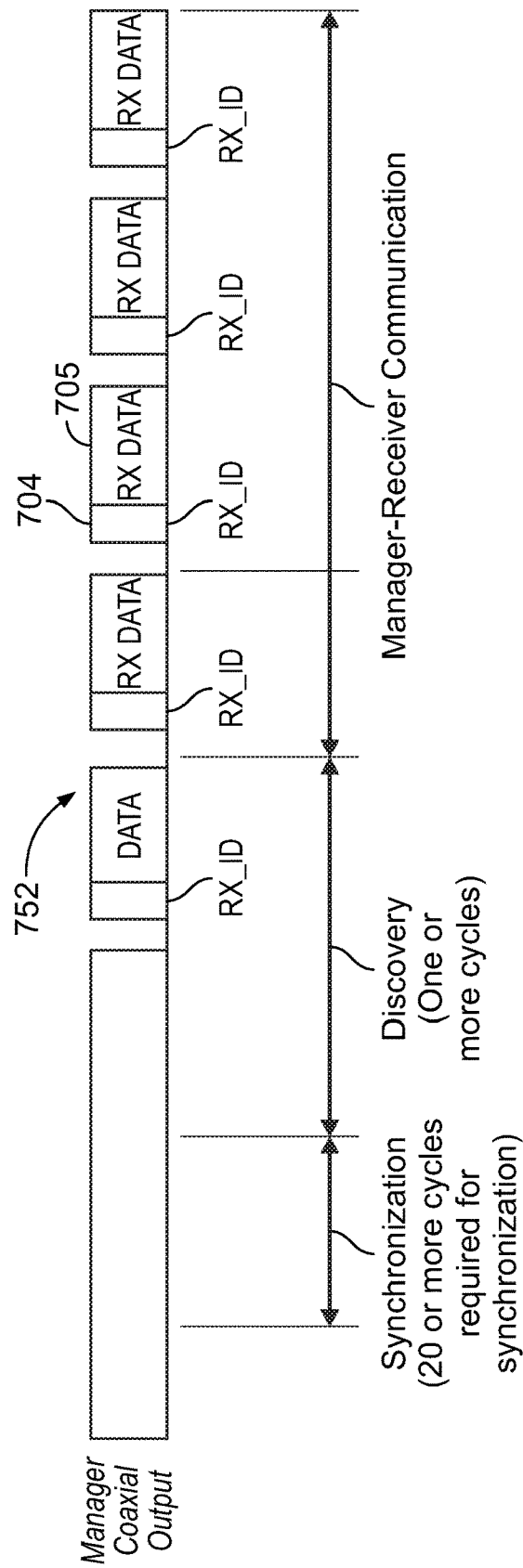
FIG. 7B shows a combined signal sent from a receiver to a resource manager over a coaxial link in accordance with an aspect of the embodiments.

FIG. 7B shows combined signal 752 conveyed from receiver 104 to resource manager 103 over a coaxial link in accordance with an aspect of the embodiments. While not explicitly shown in FIG. 7B, there is also an RF component superimposed on the digital component sub-component that includes RX_ID 704 and RX_DATA 705. Combined signal 752 is similar in format to combined signal 751 except that a synchronization sub-component may not be included.

RX_ID 704 identifies receiver 104 from the plurality of receivers 104-108 and RX_DATA 705 includes information for calibration and configuration between resource manager 103 and receiver 104.

The RF component includes the RF component transmitted to the assigned wireless microphone during the allocated timeslots on back channel 153,154. The RF component may convey information to the wireless microphone including real-time timeslot configuration, receiver status, MAC layer messaging, and the like.

The RF component includes the RF signal received from the wireless microphones transmitting on the associated DECT carrier, where receiver 104 extracts the audio signal from wireless microphones assigned to receiver 104 by processing the timeslots allocated to the assigned microphones. Receiver 104 uses synchronization sub-component 701 to properly align the timeslots.

Figure 8:
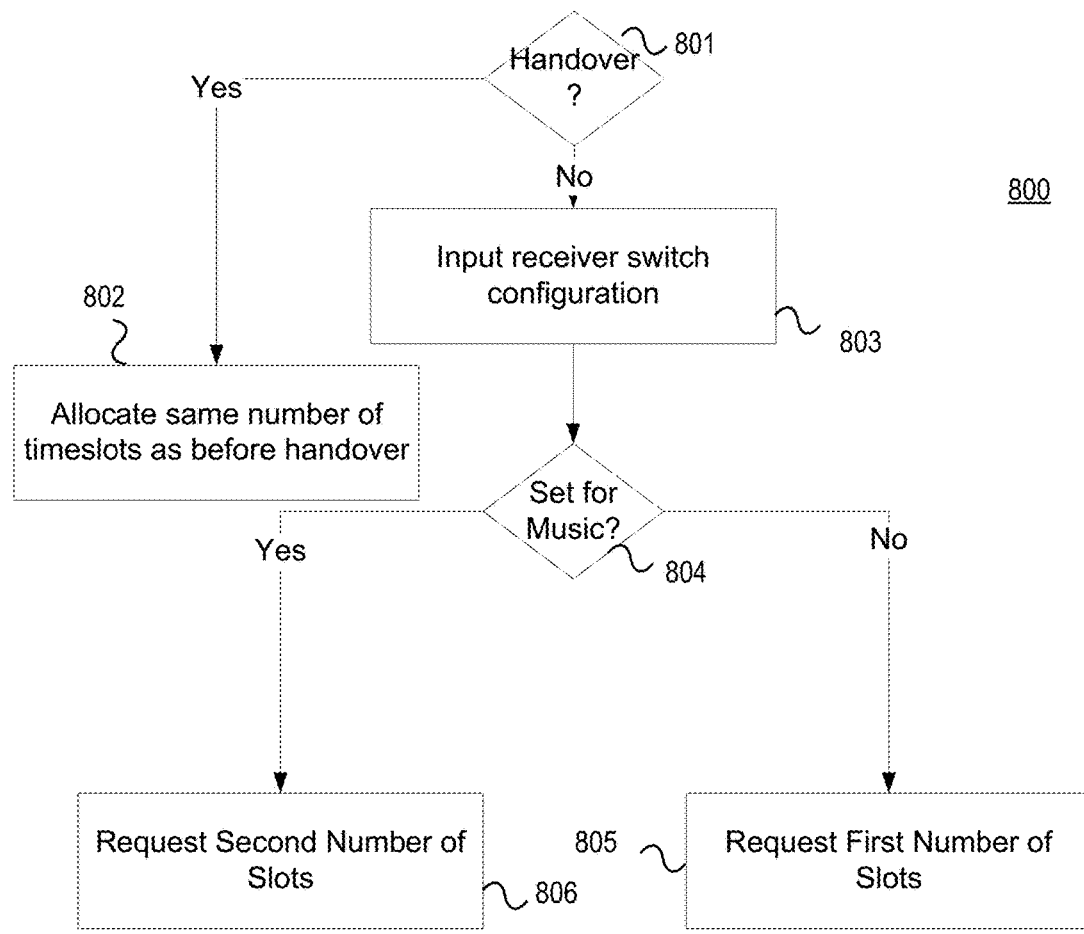
FIG. 8 shows a flowchart for allocating timeslots to a wireless microphone in accordance with an aspect of the embodiments.

FIG. 8 shows flow chart 800 for allocating timeslots to a wireless microphone in accordance with an aspect of the embodiments. With some embodiments, receiver 104 may include a configurable switch setting the number of timeslots requested for each wireless microphone served by receiver 104. For example, the configuration switch may have two settings: "talk" and "music." When the switch is in the "talk" or the "music" setting, receiver 104 requests for a first or second number of timeslots, respectively, on forward RF channel 151,152. However, when wireless microphone transfers (via a handover) to receiver 104, the switch configuration may be overridden so that the same number of timeslots are allocated for the wireless microphone as before the handover. Having the same number of timeslots for the wireless microphone before and after the handover preserves the audio quality, thus ameliorating the effects of the handover as one of ordinary skill would appreciate.

Flowchart 800 follows the above approach. If a wireless microphone is transferred to receiver 104 during a handover at block 801, the same number of timeslots on the forward channel are allocated to the wireless microphone at block 802 as before the handover.

If a handover has not occurred, the setting of the configurable switch is determined at block 803. If the switch is in the "music" position, a second number of timeslots (for example, four) is requested at block 806. Otherwise, a first number of timeslots (for example, two) is requested since the switch in the "talk" position.

Figure 9:
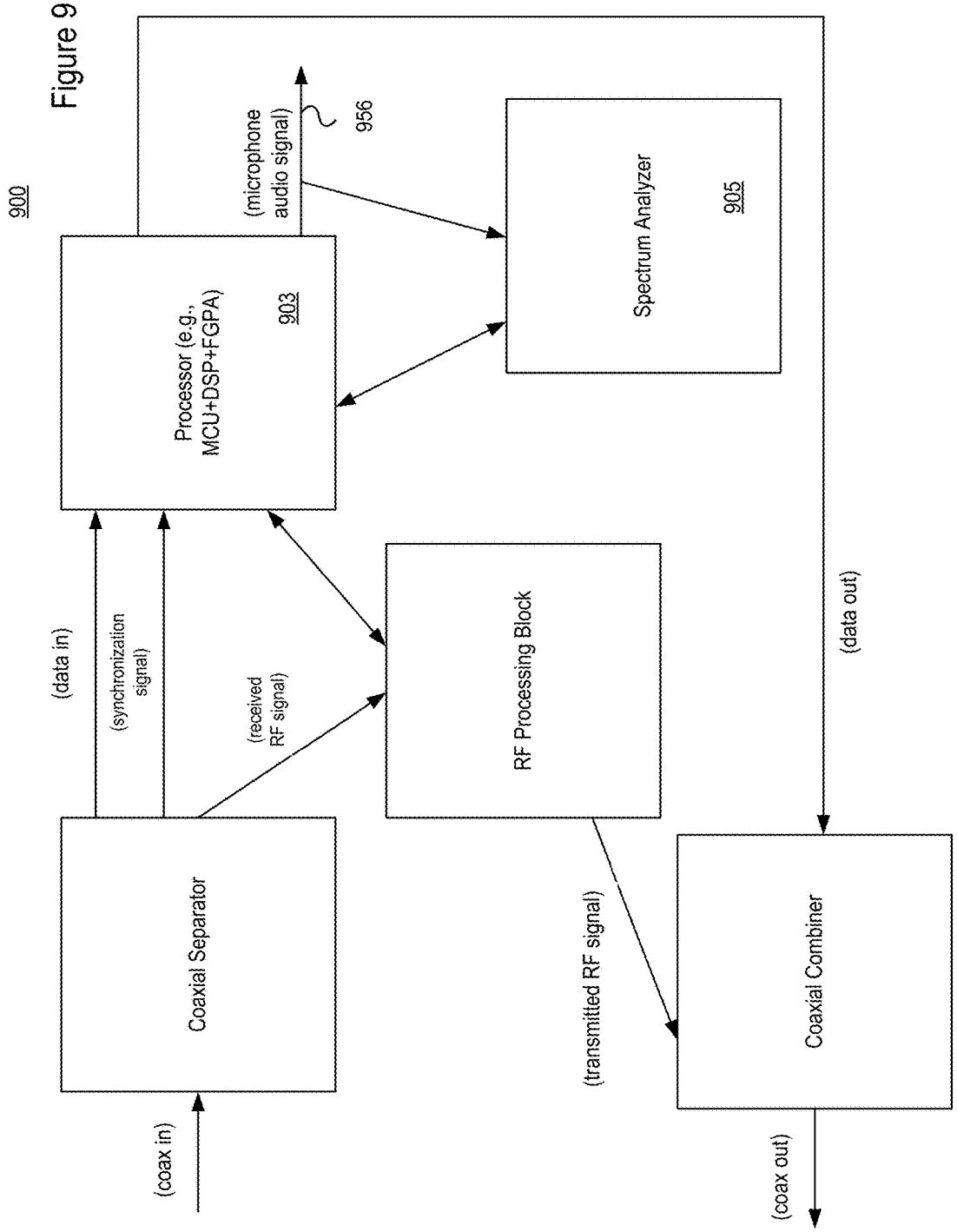
FIG. 9 shows a receiver that includes a spectrum analyzer in accordance with an aspect of the embodiments.

FIG. 9 shows receiver 900 that includes spectrum analyzer 905 in accordance with an aspect of the embodiments. Rather than determining the number of receive timeslots based on the setting of a configuration switch as previously discussed, receiver 900 determines averaged spectrum characteristics of microphone audio signal 956.

With some embodiments, spectrum analyzer 905 reports spectrum information during each DECT frame to processor 903 so that the spectrum information may be averaged over a predetermined time duration (for example, several minutes) so that the content characteristics can be captured. With this approach, the number of timeslots for a given wireless microphone may be determined in an automatic manner. Moreover, as one of ordinary skill in the art would appreciate, the number of requested timeslots may dynamically change if the type of content (for example, music versus talking) changes during a performance venue.

Figure 10:
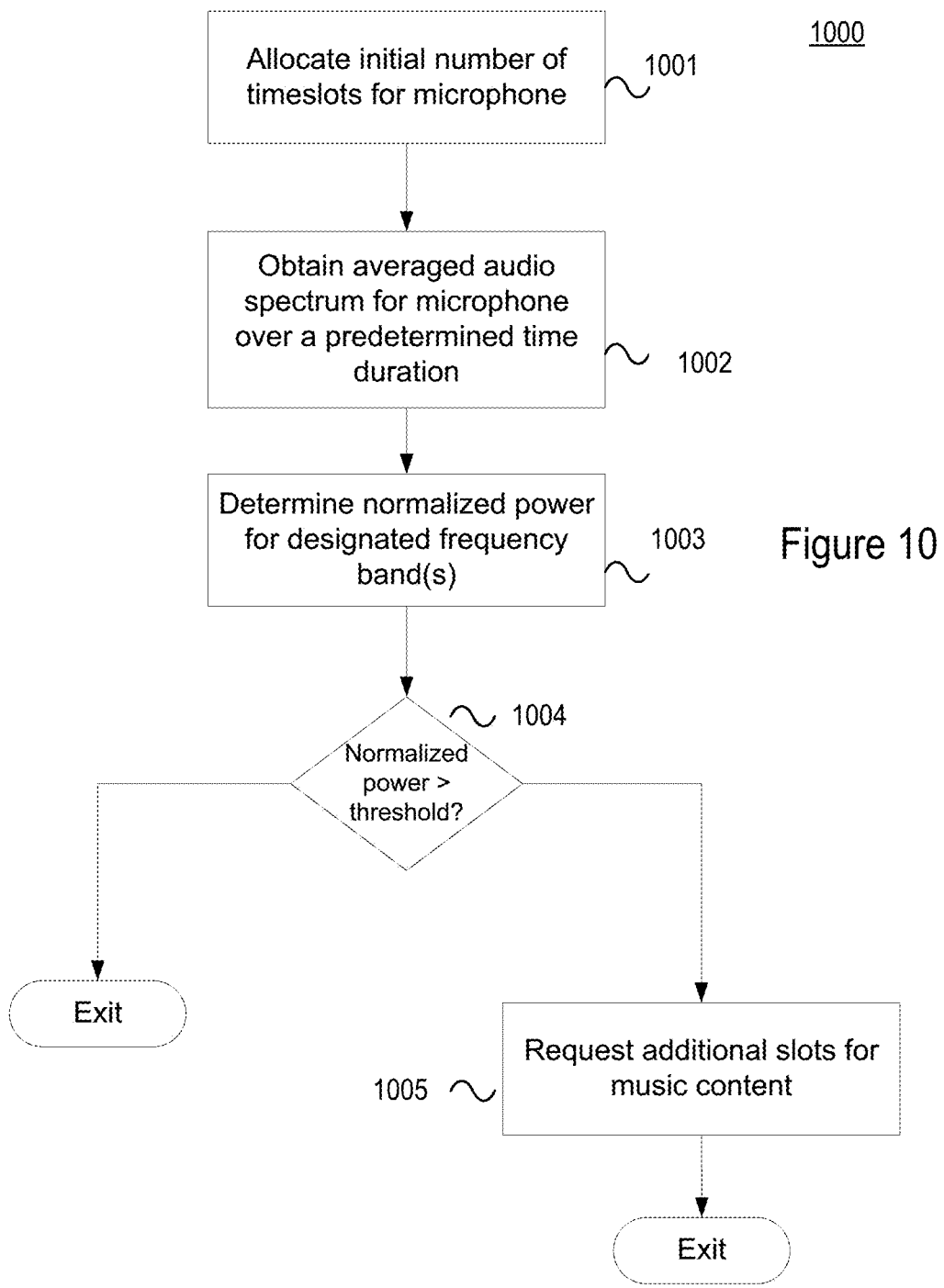
FIG. 10 shows a flowchart for allocating times to a wireless microphone with a receiver shown in FIG. 9 in accordance with an aspect of the embodiments.

FIG. 10 shows flowchart 1000 for allocating times to a wireless microphone with receiver 900 shown in FIG. 9 in accordance with an aspect of the embodiments.

At block 1001, receiver 900 allocates an initial number (which may be referred a default number) of receive timeslots for a wireless microphone. At block 1002, spectrum analyzer 905 obtains spectral characteristics during a frame and processor 903 averages the spectral characteristics over a predetermined time duration.

To determine the type of content (for example, music versus talking), processor 903 obtains normalized power levels (for example, with respect to the total average power level) for one or more frequency bands at block 1003. If power level is above a predetermined threshold (for example, which is indicative of musical content), as determined at block 1004, receiver 900 requests for additional receive timeslots for the wireless microphone at block 1005.

Receiver 900 may repeat execution of blocks 1002-1005 in order to dynamically determine the number of receive timeslots if the content type changes.

Figure 11:
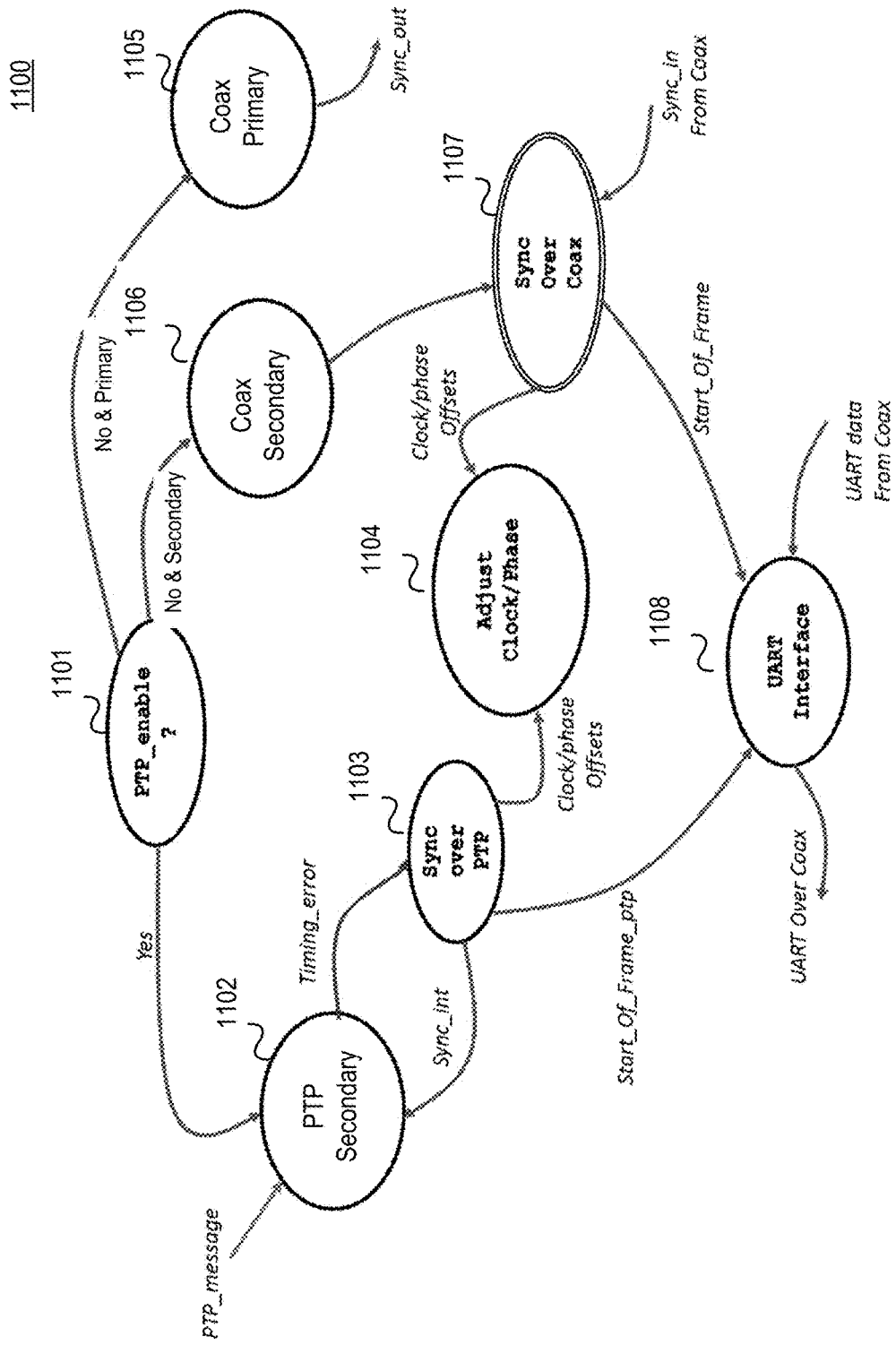
FIG. 11 shows a state machine for obtaining synchronization by a device of a wireless microphone system in accordance with an aspect of the embodiments.

FIG. 11 shows state machine 1100 for obtaining synchronization by a device (either a primary or a secondary apparatus) of a wireless microphone system in accordance with an aspect of the embodiments.

At step 1101, machine 1100 determines whether the device is Precision Timing Protocol (PTP) enabled. If so, a secondary apparatus receives PTP messaging at step 1102 from which the secondary device determines a timing offset at step 1103. The apparatus then adjusts its clock accordingly at step 1104.

If the apparatus is not PTP-enabled, as determined at step 1101, state machine 1100 obtains synchronization for secondary apparatuses (for example, receiver 205 as shown in FIG. 2 and resource manager 1402 as shown in FIG. 14) at steps 1106 and 1107. (The corresponding state machine at step 1107 is shown in FIG. 12.)

When the synchronization pulse is identified at the beginning of a frame, the data sub-component can be located within the frame because of the predetermined time relationship with the UART data transmission, for example, as shown in FIG. 7A. Consequently, UART data (the data sub-component) is extracted at step 1108.

Figure 12:
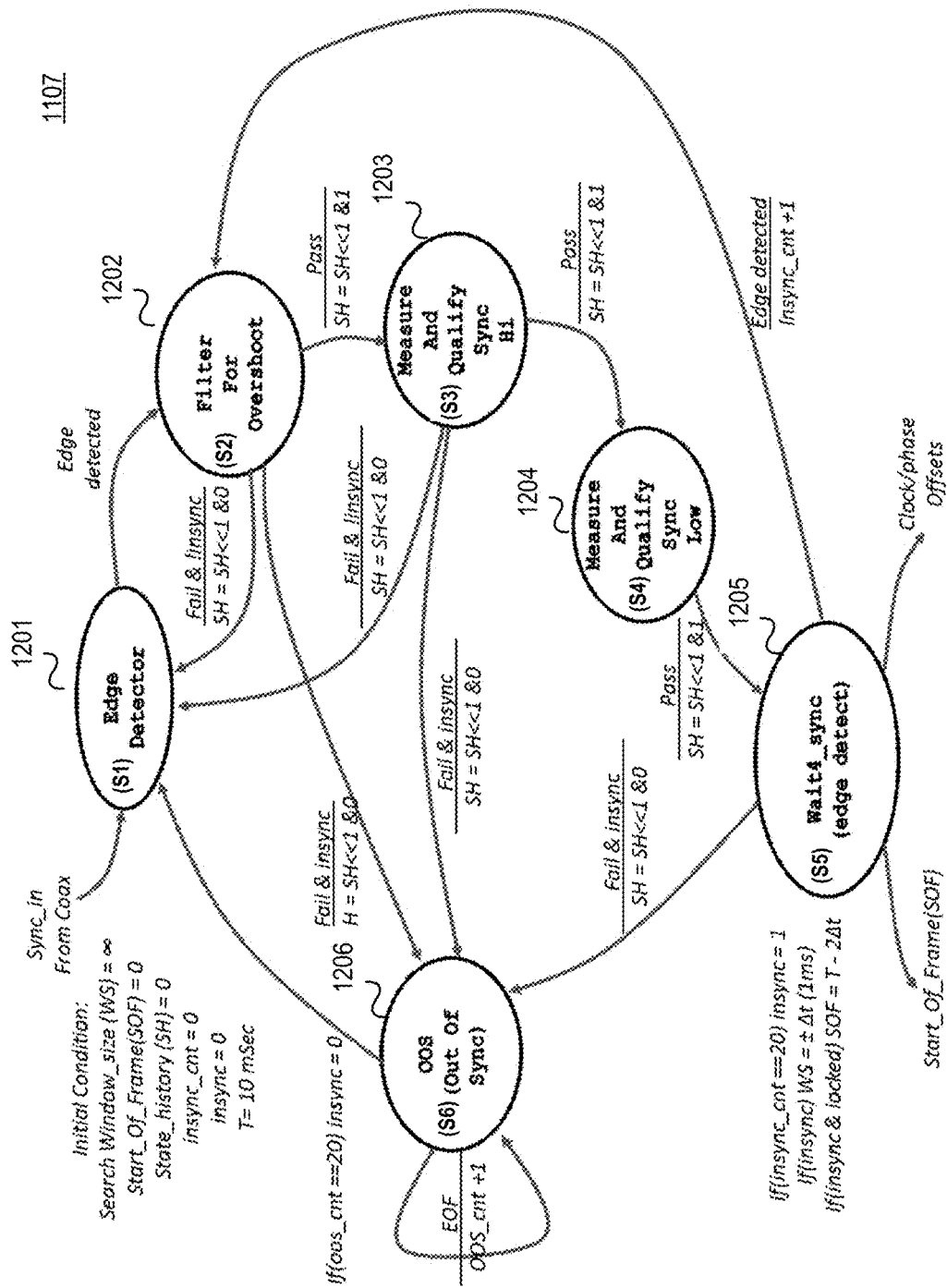
FIG. 12 shows a state machine for obtaining synchronization and data by a secondary apparatus over a coaxial connection in accordance with an aspect of the embodiments.

FIG. 12 shows state machine 1107 for obtaining synchronization and data by a secondary apparatus over a coaxial connection in accordance with an aspect of the embodiments.

With an aspect of the embodiments, a synchronization signal comprises a high pulse (for example, 0.5 milliseconds) at the beginning of a frame (for example, 10 milliseconds). Moreover, embodiments may enable a user to specify the characteristics of the synchronization pulse. For example, a user may specify a synchronization pulse to be high for 1 millisecond and off for the remaining 9 milliseconds for the frame. A data sub-component may be sent during a later time in the frame (for example, the last 8 milliseconds). This is exemplified in FIG. 7A as previously discussed.

Referring to FIG. 12, state machine 1107 detects an signal edge of a coaxial signal, which may be the leading edge (where the signal goes from low ("0") to high ("1")) of a synchronization pulse at step 1201 (state S1). However, some embodiments may alternatively detect a training sequence (for example 0, 1, 1, 0) rather than a signal edge.

During acquisition (when state machine 1107 is searching for the synchronization pulse), the data sub-component may or may not occur during the frame. Having this robustness, state machine 1107 is able to re-acquire the synchronization pulse if, for example, a coaxial link is temporarily disconnected.

At step 1202 (state S2), the signal if filtered (for example, when the edge is detected) to reduce overshoot that may result in erroneous results (for example, the signal is really low rather than high). If erroneous, the state machine reverts back to state S1. Otherwise, state machine 1107 transitions to step 1203 (state S3).

Step 1203 determines if the detected pulse is high for a sufficiently long period of time (for example, 0.5 milliseconds). If so, state machine proceeds to step 1204 (state S4) to determine if the detected pulse returns to low for a sufficiently long period of time (for example, 1.5 milliseconds) before UART data is transmitted in the remaining frame duration (for example, 8 milliseconds).

If state machine 1107 detects a sufficiently long period where the signal is low at step 1204, state machine 1107 waits for the next signal edge to occur at step 1205 (state S5). When detected, state machine 1107 repeats steps 1202-1205. When a sufficient number of iterations successfully occur (for example 20 times), state machine 1107 determines that synchronization has been achieved (acquired) so that the window size (WS) is then narrowed, for example, to ±1 milliseconds.

If state machine 1107 detects that synchronization has been lost at step 1206 (state S6), state machine 1107 returns to step 1201 (S1) so that sync acquisition can be re-initiated. In the example shown in FIG. 12, this situation occurs when synchronization is not detected for 20 frames, where oos_cnt equals 20.

With some embodiments, rather than executing state machine 1107, a secondary apparatus may separate a synchronization sub-component from a data sub-component of a composite signal received over a coaxial link by detecting different predetermined signal levels for the synchronization sub-component and the data sub-component. For example, the synchronization sub-component may be characterized a first voltage range (such as 2.5±0.1 volts) and the data sub-component (such as a data high corresponding to 5.0±0.1 volts).

Figure 13:
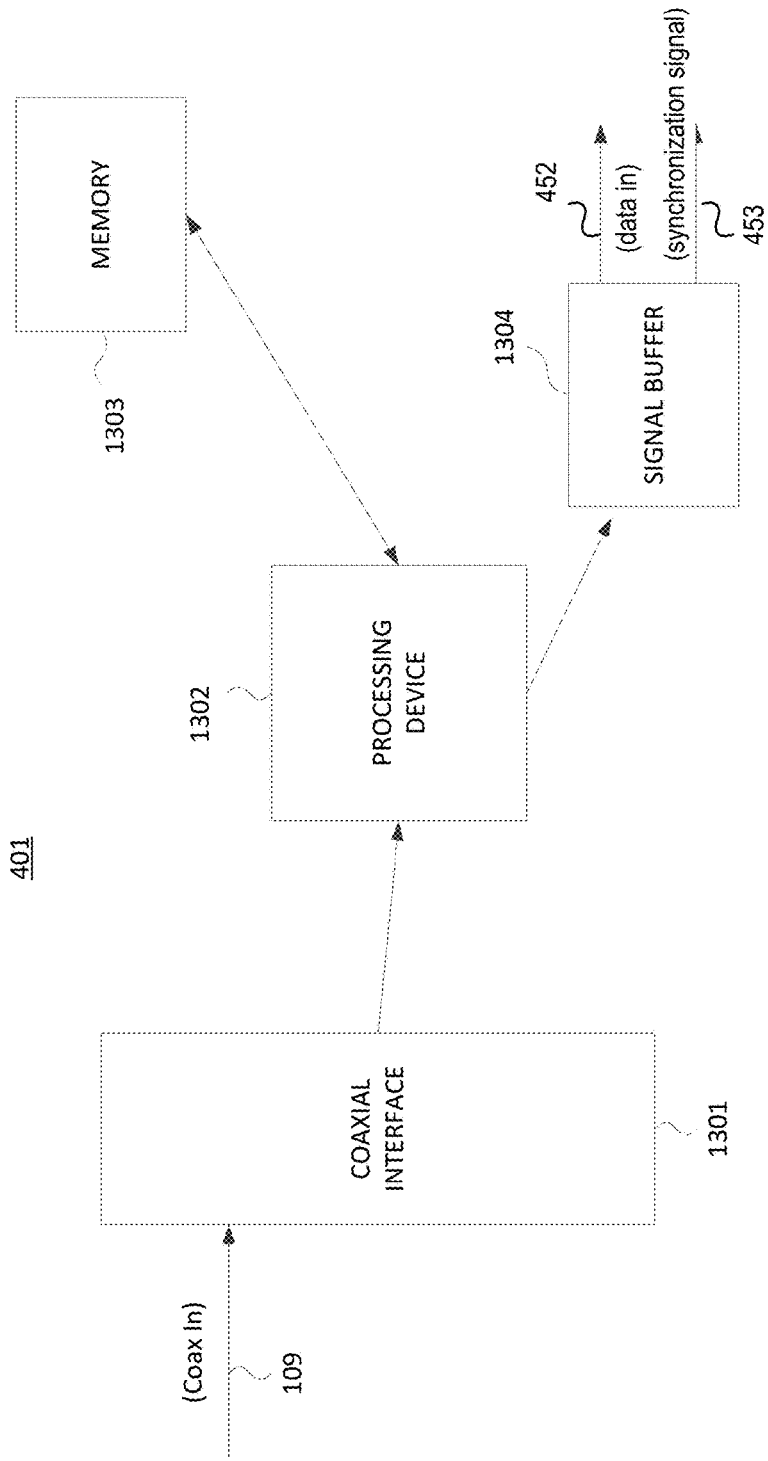
FIG. 13 shows a computing device that obtains synchronization and data from a coaxial signal in accordance with an aspect of the embodiments.

FIG. 13 shows apparatus 401 (the coaxial separator as shown in FIG. 4) processes coaxial signal 109 through coaxial interface 1301 and provides data in signal 451 and synchronization signal 453 to processor 403 (as shown in FIG. 4) via signal buffer 1304. Coaxial interface 1301 and signal buffer 1304 match the electrical characteristics required by processing device 1302 and processor 403, respectively.

Processing device 1302 may execute computer executable instructions from a computer-readable medium, for example, memory 1303 in order to implement the state machines shown in FIGS. 11 and 12. However, with some embodiments, state machines 1000 and/or 1100 may be 1200 may with implemented with one or more field-programmable gate arrays (FPGA's) or application-specific integrated circuits (ASIC's), where a state-machine is specified using a hardware description language (HDL) and the like.

Computer storage media may include volatile and non-volatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 1302. The executable instructions may carry out any or all of the method steps described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The functionality of the program modules may be combined or distributed as desired in various embodiments. Particular data structures may be used to more effectively implement one or more aspects of the disclosure, and such data structures are contemplated to be within the scope of computer executable instructions and computer-usable data described herein.

With some embodiments, processing device 1302 may comprise one or more processors. For example, processing device 1302 may include a digital signal processor (DSP) or other microprocessors utilizing one or more cores to process a subset of the total number of channels while another microprocessor may process the other channels and composite signal(s) produced by other microprocessor(s).

With some embodiments, apparatus 401 may be implemented as one or more processing devices providing non-sequential and/or parallel processing such as programmable logic devices (PLDs), field-programmable logic arrays (FPGAs), application specific integrated circuits (ASICs), or other integrated circuits having instructions or logical processing for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

FIG. 14 shows wireless microphone system 1400 configured with a primary resource manager 1401 and a plurality of secondary resource managers 1402-1407 in accordance with an aspect of the embodiments.

For example, primary resource manager 1401 may provide a coaxial signal comprising a synchronization sub-component to secondary resource manager 1402 over coaxial connection 1451 and/or coaxial connection 1452. Secondary resource manager subsequently processes the composite signal using state machines 1100 and 1106 (shown in FIGS. 11 and 12, respectively) to obtain the synchronization sub-component from the coaxial signal. Receiver 1410 similarly obtains synchronization from coaxial signals as previously discussed.

With some embodiments, a wireless communication system may utilize a combination of PTP synchronization and coaxial synchronization. For example, one or more resource managers may be synchronized via PTP while the associated receivers may be synchronized via coaxial synchronization from the coaxial signals provided by the one or more resource managers using state machine 1107.

While some embodiments have been described with respect to specific examples, other embodiments include numerous variations and permutations of the above described systems and techniques.

What is claimed is:

1. A communication system supporting a plurality of wireless microphones over a common wireless spectrum, the system comprising:
   a resource manager receiving a received radio frequency (RF) component from a first wireless microphone, the plurality of wireless microphones comprising the first wireless microphone;
   a receiver, wherein a first coaxial link electrically connects the receiver to the resource manager, the receiver supporting a first wireless microphone utilizing allocated resources on the received RF component;
   the resource manager comprising a first coaxial combiner, the first coaxial combiner combining the received RF component and a first digital component into a first combined signal, the first digital component further comprising a first data sub-component and a synchronization sub-component for transmission over the first coaxial link; and
   the receiver comprising a first coaxial separator, the first coaxial separator separating the received RF component, the first data sub-component, and the synchronization sub-component obtained over the first coaxial link.

2. The communication system of claim 1, wherein:
   the receiver further comprises a second coaxial combiner, the second coaxial combiner combining a transmitted radio frequency (RF) component with a second digital component into a second combined signal, the second digital component comprising a second data sub-component; and the resource manager further comprises a second coaxial separator, the second coaxial separator separating the transmitted RF component from the second data sub-component conveyed in the second combined signal; and the resource manager transmits the transmitted RF component to the first wireless microphone.

3. The communication system of claim 2, wherein:
the resource manager is electrically connected to the receiver through a second coaxial link; and
the receiver sends the second combined signal over the second coaxial link to the resource manager.

4. The communication system of claim 2, wherein:
the resource manager further comprises a first duplex selector;
the receiver further comprises a second duplex selector; and
the first duplex selector and the second duplex selector cooperatively activate the first coaxial link in either a forward or reverse direction, wherein the first and second combined signals are transported over the first coaxial link.

5. The communication system of claim 1, wherein the received RF component is based on time division multiple access (TDMA), and wherein the resource manager allocates a first number of timeslots to the first wireless microphone.

6. The communication system of claim 5, wherein the resource manager subsequently allocates allocated timeslots having a second number of timeslots to the first wireless microphone and wherein the first number is different from the second number.

7. The communication system of claim 6, wherein:
the receiver comprises a configuration switch; and
the resource manager determines whether to allocate the second number of timeslots from a setting of the configuration switch.

8. The communication system of claim 6, wherein:
the receiver comprises a spectrum analyzer;
the spectrum analyzer determines an averaged power value of at least one frequency band for the first wireless microphone over a predetermined time duration; and
when the averaged power value is greater than a predetermined threshold, the resource manager allocates the second number of timeslots to the first wireless microphone.

9. The communication system of claim 8, wherein:
based on the averaged power value, the spectrum analyzer determines whether received content conveyed on the allocated timeslots comprises music content.

10. The communication system of claim 5, wherein the resource manager allocates a third number of timeslots to a second wireless microphone and wherein the third number is different from the first number of timeslots allocated to the first wireless microphone.

11. The communication system of claim 1, further comprising:
a plurality of synchronization sources comprising a first synchronization source and a second synchronization source; and
wherein the resource manager selects a first synchronization source from the plurality of synchronization sources.

12. The communication system of claim 11, wherein:
the resource manager selects one of the plurality of synchronization sources based on an amount of jitter of the synchronization sub-component.

13. The communication system of claim 1, wherein the first coaxial separator of the receiver obtains the synchronization sub-component by:
detecting a beginning portion of a synchronization signal;
measuring a high level quality of the synchronization signal;
measuring a low level quality of the synchronization signal;
waiting until a next synchronization time frame;
repeating the detecting, the measuring the high level quality, the measuring the low level quality, and the waiting; and
when the repeating is successful a first predetermined of number of iterations, identifying a time alignment of the first data sub-component.

14. The communication system of claim 13, wherein the first coaxial separator obtains the synchronization sub-component by:
filtering the synchronization signal to reduce overshoot characteristics of the synchronization signal.

15. The communication system of claim 13, wherein the first coaxial separator obtains the synchronization sub-component by:
when the synchronization sub-component is not successfully detected for a second predetermined of iterations, reinitiating the detecting, the measuring the high level quality, the measuring the low level quality, and the waiting.

16. The communication system of claim 13, wherein the beginning portion of the synchronization signal comprises an edge of the synchronization signal.

17. The communication system of claim 1, wherein the first coaxial separator of the receiver separates the synchronization sub-component from the first data sub-component by detecting a first signal level range and a second signal level range and wherein the synchronization sub-component is characterized by the first signal level range and the first data sub-component is characterized by the second signal level range.

18. A method for supporting a plurality of wireless microphones over a common wireless spectrum utilizing time division multiple access (TDMA), the method comprising:
receiving, by a resource manager, a received radio frequency (RF) component from a first wireless microphone, wherein the first wireless microphone is assigned a first number of allocated timeslots and the plurality of wireless microphones includes the first wireless microphone;
combining, by the resource manager, the received RF component and a digital component to form a first combined signal, wherein the digital component includes a synchronization sub-component and a data sub-component;
sending, by the resource manager to a first receiver over a first coaxial link, the first combined signal;
separating, by the first receiver, the received RF component, the synchronization sub-component, and the data sub-component from the first combined signal; and
processing, by the first receiver, the allocated timeslots for the first wireless microphone to obtain an audio signal generated by the first wireless microphone.

19. The method of claim 18, further comprising:
combining, by the first receiver, a transmitted radio frequency (RF) component with a digital component to form a second combined signal;
sending, by the first receiver to the resource manager over a second coaxial link, the second combined signal;
separating, by the resource manager, the transmitted RF component and the digital component; and
transmitting, by the resource manager, the transmitter RF component to the first wireless microphone.

20. The method of claim 18, further comprising:
subsequently allocating a second number of timeslots to the first wireless microphone, wherein the first number is different from the second number.

21. The method of claim 20, further comprising:
determining, by the first receiver, a first setting of a first configuration switch; and
allocating the second number of timeslots based on the first setting.

22. The method of claim 21, further comprising:
determining, by a second receiver, a second setting of a second configuration switch; and
allocating a third number of timeslots based on the second setting, wherein the third number is different from the second number.

23. The method of claim 18, further comprising:
selecting a first synchronization source from a plurality of synchronization sources; and
obtaining the synchronization sub-component from the first synchronization source.

* * * * *